United States Patent
Jacobs et al.

(10) Patent No.: US 7,849,116 B2
(45) Date of Patent: Dec. 7, 2010

(54) SYSTEM AND METHOD FOR AUTOMATED LAYOUT OF COLLABORATIVELY SELECTED IMAGES

(75) Inventors: Lawrence Jacobs, Redwood City, CA (US); Shehzaad Nakhoda, Mountain View, CA (US); Xiang Liu, Fremont, CA (US); Tie Zhong, San Jose, CA (US); Fredric Scott Goell, Foster City, CA (US)

(73) Assignee: Picateer, Inc., San Mateo, CA (US)

( * ) Notice: Subject to any disclaimer, the term of this patent is extended or adjusted under 35 U.S.C. 154(b) by 345 days.

(21) Appl. No.: 12/017,280

(22) Filed: Jan. 21, 2008

(65) Prior Publication Data

US 2008/0154931 A1 Jun. 26, 2008

Related U.S. Application Data

(63) Continuation-in-part of application No. 11/438,948, filed on May 23, 2006, now Pat. No. 7,321,919.

(60) Provisional application No. 60/683,573, filed on May 23, 2005.

(51) Int. Cl.
*G06F 17/30* (2006.01)
(52) U.S. Cl. .................... 707/913; 707/767; 707/723
(58) Field of Classification Search .............. 707/913, 707/915, E17.004, E21.019, 999.107
See application file for complete search history.

(56) References Cited

U.S. PATENT DOCUMENTS

| | | | | |
|---|---|---|---|---|
| 6,438,579 | B1 * | 8/2002 | Hosken | 709/203 |
| 7,177,872 | B2 * | 2/2007 | Schwesig et al. | 1/1 |
| 7,321,919 | B2 * | 1/2008 | Jacobs et al. | 709/205 |
| 7,505,921 | B1 * | 3/2009 | Lukas et al. | 705/26 |
| 2005/0240865 | A1 * | 10/2005 | Atkins et al. | 715/517 |
| 2009/0157711 | A1 * | 6/2009 | Baer et al. | 707/101 |

* cited by examiner

*Primary Examiner*—Leslie Wong

(57) ABSTRACT

A system and method for automated layout of collaboratively selected images within a compilation for printing, viewing, etc. The images may be drawn from any number of albums owned by various users, and have associated rankings reflecting the users' behavior regarding the images (e.g., viewing, printing, recommending). Some number of images is selected for the compilation (e.g., the highest ranked images) and the images are arranged into chapters that correspond to the albums in which they are located. Within each chapter, images are ordered by time and grouped into clusters of related images (e.g., close in time, same event, same subject). Page templates are used to determine how many images to place on a page, and may be designed or redesigned so that the prominence (e.g., size) of each image corresponds to its ranking. The chapters, pages and/or images may be augmented with titles or captions.

23 Claims, 3 Drawing Sheets

SYSTEM AND METHOD FOR AUTOMATED LAYOUT OF COLLABORATIVELY SELECTED IMAGES

RELATED APPLICATION

This application is a continuation-in-part of U.S. patent application Ser. No. 11/438,948, filed May 23, 2006 and issued Jan. 22, 2008 as U.S. Pat. No. 7,321,919, which claims priority to U.S. Provisional Patent Application No. 60/683,573, which was filed May 23, 2005 and is incorporated herein by reference.

BACKGROUND

This invention relates to the field of computer systems. More particularly, a system and methods are provided for automated layout of a set of images, wherein the images are selected on the basis of ratings, recommendations and/or other actions taken by a community of users having access to the images.

The popularity of digital imagery (e.g., digital photography, digital image processing software) has naturally led to the creation and sharing of a plethora of digital images. As with traditional film images, however, some issues and problems become more apparent, and more difficult to solve, as the number of images increases and as the images become available to more people.

For example, there is always the basic problem of finding a particular image. This problem may involve finding a specific image among hundreds, thousands or even millions of images, or selecting an image appropriate for a given situation or use (again, from hundreds or thousands of candidate images). One person searching for a specific or suitable image faces a daunting task when attempting to sift through so many images, even when they can be quickly reviewed on his or her computing or communication device (e.g., computer, telephone).

Further, sharing images between people takes more time and effort as the number of images grows. If each image is to be shared with multiple people, the problem becomes even larger. Making any image available to any person gives everybody free access, but increases the number of images they must examine in order to find interesting or enjoyable ones.

Yet further, a person wishing to assemble a photo book or other compilation of digital images may face a daunting task not only in selecting images for inclusion in the compilation, but also in arranging the images within the compilation. She naturally desires to select the most interesting images, from her standpoint or from the view of someone the book is to be given to. But, as described above, she may face a daunting task in reviewing all images available to her.

Even after a number of images are selected for inclusion in a compilation, it is still necessary to arrange them in a meaningful and pleasing manner. Manual layout of the images can be very difficult because of the number of images and the many variables that can be altered, such as image size and resolution, how many and which images to include in a particular page, sequencing of pages, layout of images within a page and of pages within the compilation, etc. The vast number of permutations can be as daunting as the task of deciding which images to include in the compilation.

SUMMARY

A system and method are provided for collaborative selection of a set of images likely to be interest to a user and automatically arranging the images in a compilation.

In one embodiment of the invention, images (e.g., photos, videos) are shared within a community of users, and possibly between user communities. A user may access any image not otherwise restricted, and can recommend images to other users, assemble compilations of any images the user can access, order a physical compilation (e.g., a photo book, a yearbook) etc.

As users view images, make recommendations, explicitly rate images (e.g., on clarity, composition, interest), download images, assemble compilations, and/or take other actions, metrics regarding their activities are tracked. The metric values may be normalized, and then weighted and combined to produce, for each image and for each user, a ranking or rating of the estimated level of interest that the image may hold for the user.

Ratings of images for a user may be used to order them for electronic presentation to the user, assemble a set of images for an electronic compilation (e.g., an online album) or physical compilation, or for some other purpose.

In another embodiment of the invention, a set of images is automatically arranged or laid out in a compilation. The compilation may be designed for printing as a physical book or poster, may be configured as an electronic book for online viewing, may be used as a personalized webpage or website, or for some other use.

In this embodiment, the images to be included in the compilation may be collaboratively and/or manually selected. For example, some number of the highest rated images meeting certain criteria (e.g., from a particular community of users, from a particular album, featuring a particular subject, reflecting a particular event) are automatically selected, separated into chapters (e.g., depending on the number of images, how many events or subjects are covered by the images) then grouped and arranged in pages. Various page templates (and/or chapter templates) may be used to lay out different numbers of images on different pages, with different sizes and positions.

DETAILED DESCRIPTION

Figure 1:
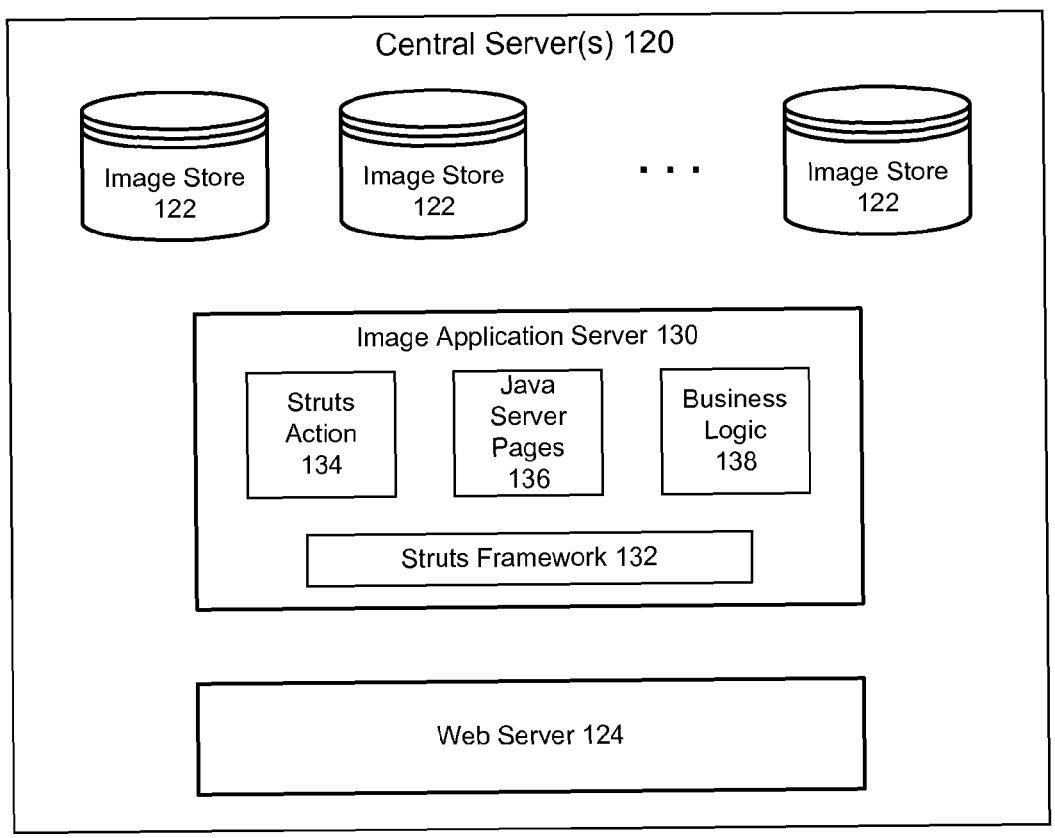
FIG. 1 is a block diagram depicting a system for collaborative selection of images, in accordance with an embodiment of the present invention.
Figure 1:
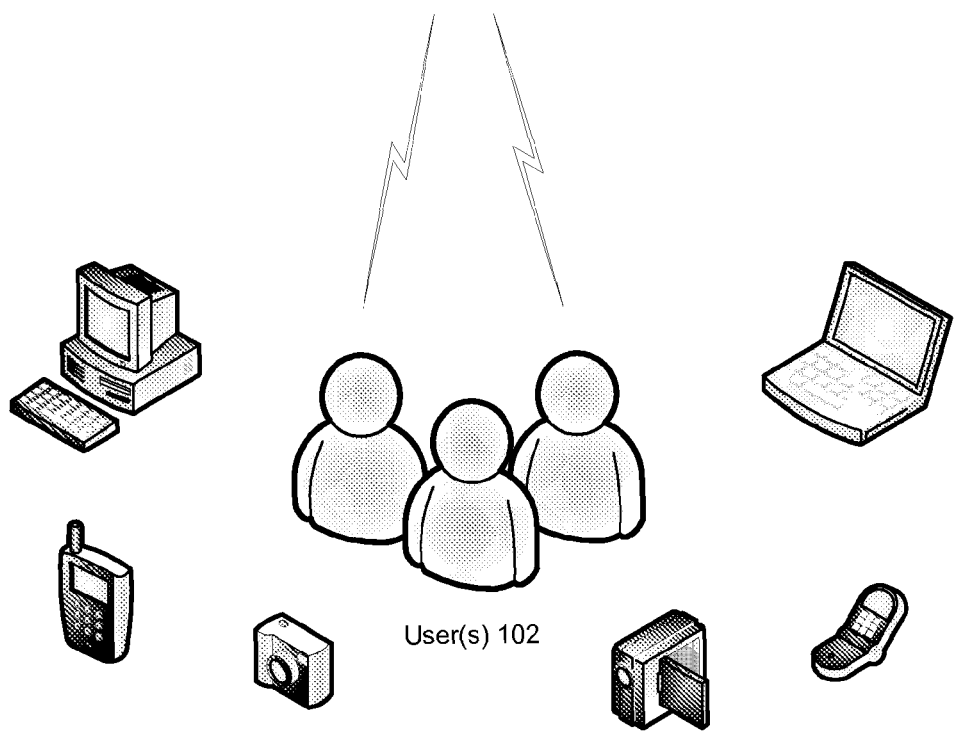

The following description is presented to enable any person skilled in the art to make and use the invention, and is provided in the context of particular applications of the invention and their requirements. Various modifications to the disclosed embodiments will be readily apparent to those skilled in the art and the general principles defined herein may be applied to other embodiments and applications without departing from the scope of the present invention. Thus, the present invention is not intended to be limited to the embodiments shown, but is to be accorded the widest scope consistent with the principles and features disclosed herein.

Introduction

In one embodiment of the invention, a system and method are provided for collaborating on the selection, sharing and management of images. Although embodiments of the invention may be described with reference to digital photographs, such embodiments may be readily modified for other types of images (e.g., cartoons, pictures, charts), whether still or moving (e.g., video).

The images may exist in different forms (e.g., digital, hardcopy) at different times, depending on the action being taken. For example, a set of images may be created and shared in digital form for easy storage and transmission via electronic mail, file sharing and so on. However, some or all of those images may be printed or otherwise embodied in a physical compilation such as a photo book, yearbook, catalog, etc. Embodiments of the invention described herein are well suited for selecting appropriate images to be included in a physical compilation.

In this embodiment, users may be grouped into communities for the purpose of sharing images created or modified by the member users. For example, users may upload digital photos for their own enjoyment and/or the enjoyment of other community members. Actions taken by the members with regard to a particular image will affect the image's ranking. Illustrative actions include, but are not limited to, sharing, printing, viewing, enlarging, purchasing, modifying, recommending, etc.

Based on the rankings associated with the images, a subset of the images may be automatically identified and presented to a user when she wishes to view some images, choose some for printing, or take some other action. The images presented to the user may be those images that were deemed of most interest to the entire community or some subset thereof, as reflected in the rankings.

In another embodiment of the invention, a set of images—which may be collaboratively selected as described above—is automatically laid out in a compilation for electronic viewing, printing or other purpose. The images may be arranged into chapters that reflect some logical or sensible grouping of subsets of images, and a chapter may comprise any number of pages of images. A page may contain any number of images, arranged in various fashions, sizes, prominence, resolution and/or other characteristics. For a set of images that are selected via collaborative rankings, the rankings may affect where and how prominent a given image appears on a page, the sequencing of pages within a chapter, and/or other aspects of the compilation.

Collaborative Image Selection

In an embodiment of the invention, users are grouped into communities that are defined or differentiated by any number of characteristics, and may collaborate in different ways or capacities at different times. Illustratively, a community may be defined by a common interest or activity of its users. For example, a community of users may be organized around a community organization, a geographical location, a sport or hobby, a particular school that a family member of the users (e.g., son, daughter, nephew, niece, grandchild) attends, etc.

A community may include any number of users, and a user may belong to any number of communities. A user may participate in a community by creating images (e.g., taking digital photographs), distributing them, processing (e.g., "touching up") images, storing images, evaluating or recommending images (e.g., by alerting other users to images that may be of interest to them), arranging images for printing or other presentation, and so on. Any particular image may be shared among any number of communities, and among all or a subset of users within a particular community.

A community may be nested within another community. For example, a community associated with a kindergarten class may share images relating to students and activities of the class. This kindergarten community may be a sub-community associated with multiple grade levels, such as a lower school or grade school. Nesting of communities may be extended any number of levels. Thus, the lower school community may be part of a community associated with a school group that also includes an intermediate school, a high school and so on.

Images may be shared automatically. In other words, a community user or member need not explicitly indicate who an image should be shared with. Instead, images may be automatically shared throughout a community (including future members) and/or across communities. However, policies may be created to identify which images should or should not be shared, who they should or should not be shared with, etc. Therefore, one user may specify that some set of images should be shared with a specific user, or that all images he creates that match certain criteria (e.g., date, event, subject) should automatically be shared with some or all community members.

Images may be organized, stored and shared individually (e.g., as separate files) and/or as compilations (e.g., electronic albums, books), and may be shared among any number of users and communities. A compilation may comprise a set of images having some common theme (e.g., an event, a subject) and/or a relatively loose collection of images that have little or no inter-relation. As will be described in more detail below, a compilation may be created, organized or reorganized manually and/or automatically, and may be used to generate a hardcopy book (e.g., photo book, yearbook) with manual or automated layout (e.g., image sizing, arrangement, background, cover art).

Any image may be included in any number of compilations, and in any number of communities. And, one compilation may contain (or be contained within) any number of other compilations. References herein to compilations (e.g., for purposes of organizing or sharing images) may be interpreted to cover virtually any form or type of collection of images (e.g., slideshows, photo books, yearbooks, folders of images, any set of images transmitted or stored in logical or physical proximity).

An image may be annotated by a user or may be accompanied by metadata that includes various information regarding the image, such as date created, creator, location, caption, inscription, keywords, tags, description (e.g., of who or what is in the image), who (e.g., what users) have recommended or not recommended the image, who likes or does not like the image, etc.

In an embodiment of the invention, an image collaboration system described herein is employed to promote collaboration between users. More particularly, a user may access an image and take various actions, such as recommend it to another user, forward it (a copy of the image) to another user, add it to a compilation of images, rate or rank it on how interesting or relevant it is (e.g., to the viewing user, to another user), submit a caption, description or other metadata, and so on.

An estimate of how interesting an image may be for a user or a group (e.g., community or sub-community) of users may be based on a variety of criteria or factors mentioned herein. Some of those factors include how often an image is viewed by a given user and/or a set of users, the size with which it is viewed, how often it is included in a compilation of images assembled for a user, how often a hard-copy version of the image was requested, how frequently it was downloaded or forwarded, and so on.

The system can then automatically select images for presentation to a given user by applying what it has learned about the images. For example, if multiple users have recommended an image to the given user, when that user accesses the system to view images the recommended image may be assigned a relatively high rating in terms of how interesting or relevant it probably is to that user. An image's rating may determine whether it is presented to the user, the order in which it is presented, and/or other actions.

Further, relationships between users can be learned and applied to affect image rankings. For example, recommendations of a particular image to a given user may carry more weight if they are from relatives of the user or from other users that the given user interacts with (e.g., exchanges images and/or recommendations with) than if they are from people the user has more tenuous relationships with.

Community-level activity may also affect how interesting or relevant an image is determined to be for a user. For example, if an image is released in multiple communities, but is accessed or is more frequently recommended in a first community than a second community, it may be deemed more interesting to users in the first community and may be presented to them more often than to users in the second community.

Thus, in different embodiments of the invention, various metrics described herein may be employed to determine how interesting an image is to a specific user, a community of users and/or a subset of users with a community (e.g., users within one family). Images may be assigned values for any number of metrics, and those values may be weighted by some determination of how closely they correlate with user interest.

The rating or ranking of an image may be affected by its grouping with another image. For example, if a user adds an otherwise relatively low ranking to an image comprising relatively high ranking images, or arranges the image on a page (e.g., of an electronic album, of a layout for a physical book) with a higher ranking image, the ranking of the image may be increased.

By calculating and combining the weights in some fashion, images can then be ranked based on their estimated relevancy. Separate calculations may be done for each user, for each of any number of images. The values finally assigned to the images may be used not only to determine whether and when to present them to a user for review, but may be used for other purposes as well.

For example, in one embodiment of the invention the interest rankings of images may be used to facilitate the automatic generation of a compilation of images for an electronic album and/or a physical image book such as a photo book or yearbook. In particular, a user may be able to submit a single request, through just a single click of a mouse, for example, and the system can automatically select a default or selected number of images and offer to have the images printed and bound into a book. The selected images may, of course, be used for some other purpose, such as an electronic image album, a slideshow, wallpaper or background for a user's computer display device, etc.

When a set of images is selected for a compilation, whether electronic or physical in nature, the images may be laid out automatically by the system and/or manually by a user. For example, the system may attempt to arrange the images in chronological order, and may also attempt to maximize the compilation's appeal by considering an image's resolution or size, the orientation of an image (e.g., portrait or landscape), a theme of the compilation (e.g., a school field trip, a party), etc.

FIG. 1 is a block diagram depicting a system for facilitating collaboration in sharing, rating, recommending, organizing, selecting and/or otherwise handling images, according to one embodiment of the invention. Other systems having comparable functionality but different architectures may be derived from this figure and the corresponding description without exceeding the scope of the invention.

Users 102 may create images in different ways, through digital or analog photography using a stand-alone camera or a camera embedded in a telephone, with graphics software, hand drawing and so on. In this embodiment, however, each image is captured in a digital form at some point, using virtually any protocol or file structure now known or hereafter developed, such as bitmap (.bmp), windows metafile or enhanced windows metafile (.wmf, .emf), jpeg (.jpe, .jpeg, .jpg), portable network graphics (.png), etc.

The collaboration system allows users to share images with other users, recommend images to users, organize images into compilations (and share the compilations), request generation of an electronic compilation (e.g., based on user recommendations or rankings), request creation of a physical image book (e.g., a photo book, a yearbook), and take other actions with regard to the images, as described below.

In particular, the collaboration system may facilitate discussion of an image, through annotations to the image's metadata, online text or voice chat, electronic mail, etc. Discussion regarding a particular image (or compilation of images) may affect the system's ranking of that image (or compilation) for the communicating users and/or other users.

An image collaboration system such as the system of FIG. 1 may include any number of central servers for receiving images from users, serving images to users, storing and manipulating images, rating the estimated level of interest in an image, selecting images for presentation to a user, etc. A single central server 120 is illustrated, but does not limit the number of central servers employed in other embodiments of the invention.

Central server 120 comprises web server 124 for interfacing with users via their computing/communication devices (e.g., laptop computers, desktop computers, smart phones, personal digital assistants). Web server 124 thus receives requests from users and serves responses to their requests, and may perform authorization and/or authentication functions.

In the illustrated embodiment of the invention, image application server 130 is responsible for facilitating collaboration, recommendation, ranking, organization and other manipulation of images. In one implementation of this embodiment, the image application server employs the Struts web application framework. This framework is deployed within a servlet container (e.g., as defined by the Java Servlet Specification), such as a container provided by Apache Tomcat. Struts enables the separation of user interface functions from image processing or handling logic (e.g., the "business logic").

In this implementation, the Struts framework includes an ActionServlet designed to receive a request (e.g., from a web server, directly from a user's web browser) and invoke an appropriate Struts Action. Each Action is configured to perform a specific function in the application, such as add an image to a compilation, recommend an image from one user to another, add a print of an image to a user's shopping cart, etc.

When a Struts Action completes its work, which may be assisted by an application-specific business logic layer—the Action invokes a Java Server Page 136 (or other interface component) to deliver presentation markup code to the user. This code may include references to any number of images.

Business Logic 138 comprises application-specific logic for performing back-end tasks such as resizing an image (e.g., as a thumbnail, for full screen viewing), issuing an electronic mail message to a user to inform her that new images have been added to her community, integrating prints and orders for photo books with a vendor's order processing system, etc.

Image application server 130 may comprise a java virtual machine or similar environment for supporting object oriented programming using the Java programming language and/or other suitable programming languages.

A central server includes any number, type and configuration of storage devices 122 for storing images. Additionally, some images manipulated or accessed by central server 120 may be stored on users' devices. In particular, a user may create a new image and temporarily or permanently store it on his or her local device. The system may also upload a copy to central server 120 for purposes of sharing with other users, generating an image compilation and so on. In one implementation, image stores 122 may store millions of images and thus comprise storage capacity in excess of one petabyte. A database or data server for managing access to the stored images may be included in central server 120 (e.g., as part of image application server 130 or image stores 122).

User interaction with central server 120 and manipulation of images can be logically separated into four layers. A presentation layer controls the presentation of images to a user on his or her computing/communication device. Logic for the presentation layer may be designed using HTML (HyperText Markup Language), Adobe Flash (e.g., for displaying or laying out images) and/or other suitable code or models. Illustratively, presentation logic may be stored on a central server (e.g., with web server 124 or some component not depicted in FIG. 1) and delivered to a user's device as needed (e.g., when the user connects to the server).

Alternatively, however, presentation logic may be stored on a user's device as part of a native application program, and therefore may not need to download presentation layer logic from a central server. In this alternative implementation, the collaborative sharing of images may operate in a peer-to-peer mode instead of (or in addition to) a centralized mode. In particular, storage of images may occur only (or partially) on user devices.

A communication layer handles communication between central server 120 and presentation layer logic operating on a user's computing/communication device. The communication layer may deliver the presentation layer logic as needed (e.g., when the user connects to the central server), and also delivers user requests (e.g., for images) to the central server processing logic, and conveys any response.

The processing logic layer sequences user activity within the system and services user requests, but also manages and presents images as needed. The processing logic layer may manage user sessions and deliver appropriate interfaces or options (e.g., web pages, application pages, java server pages) to a user based on the appropriate options for the user's current state. Thus, the processing logic may be required to determine what images should be delivered to a user. The processing logic also receives data from users—not only new images, but also rankings, recommendations, descriptions and/or other metadata regarding images.

Finally, a data management layer of logic manages the storage, retrieval and caching of information about users, communities and images. All persistent information relating to user interaction with images, image metadata, the organization of images and other information about the state of the image collaboration system is handled by this layer. The data management layer may comprise a suitable database management system, such as a MySQL database.

In different embodiments of the invention, different criteria may be employed to rate/rank an image or estimate its interest to a specific user or a group of users. Such criteria include information regarding the image, such as the subject, an event or setting in which it was captured, image quality, date and/or time, size, type (e.g., bitmap, jpeg), clarity, etc. Criteria for estimating an image's interest may also include activity involving the image, such as whether (or how often) it was recommended or forwarded from one user to another, whether it was included in a compilation of images, how often it was accessed (e.g., downloaded, viewed), whether it was annotated by a user (e.g., to add a description or caption), and so on. Yet other criteria may also be considered, such as relationships between users making and receiving a recommendation regarding the image, the community (or communities) to which a user who receives a recommendation belongs to, other users in the same community as a user receiving a recommendation, etc.

The following is an illustrative set of metrics that may be employed in an embodiment of the invention to determine a user's estimated level of interest in an image. These metrics need not all be employed, and do no limit the criteria that may be employed in other embodiments.

Recommendation: A community user may recommend an image to another community user. An image P recommended by user A to user B will be ranked higher for user B (regarding estimated interest) than an image not recommended to user B. The weighting given to this criterion may increase in proportion to the number of recommendations issued to user B.

Similarly, the more recommendations issued by user A regarding image P, the higher the ranking assigned to image P for user A.

Recommendation from Relative: If user A recommends image P1 to user B and they are related (e.g., by blood or interaction), and user C recommends image P2 to user B but they are not related, image P1 will be rated higher than image P2 for user B.

The weighting given to a recommendation between related users may vary with the level of interaction (e.g., frequent communications) or closeness of relation (e.g., husband and wife) of the users. Two users may be considered "related" if they appear in the same image. Their level of "relatedness" may increase according to the frequency with which they appear together in different images, so that their recommendations to each other will carry more and more weight. Identities of users appearing in an image may be included in the metadata regarding an image.

Two users may also be considered "related" if they have similar interest in an image. For example, if user A recommends image P1 to user B and user B includes the image in a compilation or a set of favorites, but did not include an image P2 recommended by user C, a later recommendation from user A to user B regarding image P3 will carry more weight than a recommendation from user C to user B regarding some other image. The weight may increase with the number of recommendations.

Recommendation between Other Users: A user's estimated interest in an image may also be affected by recommendations between other users, especially if the other users are in the same community. Thus, if user B views an image that was not recommended to her specifically, but was recommended by user A to user C, that image may be ranked higher for user B than an image not recommended by another user. The ranking may increase with the number of recommendations.

Recommendation Exclusivity: An image P1 recommended just to user B may be ranked higher for user B than an image P2 recommended to multiple users including user B. Illustratively, image P1 may be a portrait of user B while image P2 is a group photo.

Image Creator: Images created or processed by one user may be consistently more appealing to users than images provided by someone else. Thus, if user A creates image P1 and image P1 is recommended more frequently (e.g., within the same community) than an image P2 created by user C, a later image created by user A may be ranked higher than a later image created by user C. Creation of an image may involve taking a digital photograph, generating a digital image via graphics or drawing software, etc.

Explicit Rating: A user may explicitly rate or rank an image. Images with higher ratings may then be weighted more heavily (regarding other user's likely interest) than images with lower ratings. As described above regarding recommendations, an explicit rating from user A may be given different weights when determining how interesting an image is for user B, depending on whether and how user A and user B are related. Thus, if user A and user B are members of the same family, their ratings may be weighted more heavily for each other than ratings from other users.

Compilation Exclusivity: An image added to a compilation (e.g., electronic album, set of favorites) just by user B may be ranked higher for user B than an image added to compilations by user B and by other users.

In addition, however, an image added to a compilation of user B may be ranked higher for a different user in user B's community than an image not included in any community user's compilations.

Image Resolution: A larger image or an image of relatively high resolution may be ranked higher than an image of lower resolution or size.

Image Clarity: Sharper images may be ranked higher than unclear images. Clarity of a digital image may be measured by a standard image processing technique, such as by measuring the occurrence of high frequencies in fast Fourier transforms.

User Interaction with Images: As users view images via the image collaboration system (e.g., images served from image application server 130 of FIG. 1), they may take various action (e.g., view, download, forward, recommend), etc. Their interaction with an image may increase the ranking of that image for them and/or other users.

For example, as a user views a relatively large version of an image (e.g., expanded from a thumbnail by hovering over the thumbnail), a ranking for that image may be increased. If a user has to click on a thumbnail, icon or description of an image to access a larger view, the ranking of that image may increase. The ranking of an image may also increase with the number of times the image is viewed or otherwise accessed. Yet further, the length of time between a user's access of an image and a subsequent access of the same image by the same user may increase or decrease the image's ranking.

Metadata: The ranking of an image for a user may increase when that user (or possibly a related user) submits metadata for the image, such as a description, caption, event, subject(s), etc.

Subject Exclusivity: An image's ranking may be affected by the number of subjects identified for an image (e.g., the more people that appear in the image). For example, if user B is identified as the only subject in image P1, and just one of multiple subjects in image P2, image P1 may be ranked higher for user B than image P2.

As can be seen by the variety of illustrative metrics described above, information for estimating interest in an image may be gathered directly from users (e.g., as an explicit rating), may be inferred from a user's activity (e.g., whether or how often she accesses an image), may be inferred from other user's activities, etc. Activities of a user may be more relevant in determining the interest of a "related" user, wherein one user may be considered related to another if they are kin or if they interact relatively frequently (e.g., exchanging images and/or recommendations, reviewing images created by each other).

For any or all of the metrics, individual values may be derived for any tuple {user, image}. Thus, separate values may be generated for each user, for each image. The values may be weighted according to how closely the corresponding metric is believed to correlate with user interest. Default weights may be used, and/or context-specific weights may be applied.

Illustratively, one set of weights may be applied for the purpose of ordering images to be presented a user who wishes to view images she has not yet seen. A different set of weights may be employed to order or arrange images for printing in a physical compilation. For example, image resolution may be critical in the latter situation, but almost irrelevant in the former.

Weights for modifying metric values may be set by a system administrator (e.g., an operator of image application server 130 of FIG. 1) for general application to any number of images, users and communities. Or, the weights could be tuned, not only for different purposes (e.g., initial image viewing, physical compilation layout) but for individual communities or other sets of users.

Weights may be modified based on the composition of a user community. For example, if all or most users in a given community are related, then metrics affected by users' relationships may not be very useful. Conversely, if another community is very large and has relatively few inter-related users, then relationships may be very important.

Individual users may help tune weights employed for estimating image interest for those users. Illustratively, the user could answer a set of questions designed to help formulate optimal weighting.

Weights may also, or instead, be adaptive or dynamic. For example, the accuracy of a given set of weights W1 for user B could be observed by examining how often user B selects resulting highly ranked images as favorites, includes them in compilations, recommends them to family members or other related users, etc. If the correlation is relatively weak, the system may adopt a different set of weights W2 for user B and determine whether set W2 works better, and so on.

Images need not always be presented or arranged for a user in decreasing order of their estimated interest for that user. Some or all may be presented in reverse order (e.g., to provide incentive for continued viewing) or in a random order.

When a user views or otherwise accesses an image (e.g., reviews a list of image captions or titles, scans a selection of thumbnails), he may be asked or prompted to recommend the image to one or more other users, forward a copy (e.g., via electronic mail), download it, save it as wallpaper or a background on his computing device, request a hard-copy (e.g., physical print, photo book, album), add it to a compilation, submit metadata regarding the image (e.g., description, event, subject), rate it according to interest or quality, and so on.

In one embodiment of the invention, some form of intelligent subject determination may be applied to an image. The image collaboration system can therefore facilitate users' searches for images containing particular people or other subjects.

Illustratively, a subject of an image may be inferred from a user recommendation. For example, if image P is recommended to user B, there is some probability that user B (or at least some subject of interest to user B) appears in image P. The probability may increase proportionately to the number of times image P is recommended to user B by different users, especially if it is recommended to few (or no) other users. An image that is recommended to many different users, including user B, may include user B as a subject but is likely to be a group image.

A subject of an image may also be inferred by examining which user or users add the image to their favorites or some other compilation of images. In particular, an image selected by user B as the lead, first or other principal image of a compilation may be likely to include that user as a subject. Similarly, the title of a compilation that includes a particular image, and/or metadata of the image (e.g., caption, description) may give a clue as to a subject of the image.

In another embodiment of the invention, explicit or learned relationships between users may be factors in selecting images for presentation to a user or in weighting metrics used to facilitate image selection. For example, if users A and B appear together (e.g., are subjects) within a given collection of images, some relationship may be assumed to exist between them. Then, when user B requests a compilation of images (e.g., a slideshow, an album, a photo book), images may be drawn from that collection because of the users' relationship. Depending on the strength of user B's relationship with user A (e.g., how many images they appear in together), more images for the compilation may be selected from that collection than from a different collection reflecting user B's relationship with user C.

In an illustrative embodiment of the invention, names, captions or titles for images or for a set of images reflecting a particular event may be derived based on information provided by the image creators and/or information gleaned from the users' client devices. For example, digital photographs of a school's Tuesday afternoon soccer match taken by different users may be correlated based on their date/time of creation or upload, the fact that the users are members of a user community associated with the school, etc. The image collaboration system can then automatically suggest an appropriate name for the collection of images.

An image collaboration system may support multiple versions of a single image. Illustratively, any user within a community may edit any image within that community unless it is restricted. An edited image may be stored as a new version of the image, as an entirely new image, or may even replace the original image (in one implementation only the creator of an image or an administrator may replace an image or delete an image from the community). An edited version of an image may alternatively be kept private for the editor and any user the editor wishes to share it with. The extent, timing, frequency and/or other characteristics of edits to an image may affect its ranking.

If an image is replaced with a new version, it may or may not automatically be replaced in every electronic compilation in which it appears. For example, users may be asked if they wish to replace the version(s) in their compilations. Automatic replacement may depend on the type of modification made to the original image, whether a relationship exists between the editor and a user who has the image in a compilation, and/or other factors.

In an embodiment of the invention, any set of images may be shared among all users in a given community, or may be restricted to some subset of users within the community or even to a single user. In this embodiment, the creator of an image or an administrator may restrict access to the image as desired.

From a set of images available to a user, the user may select any subset to form a compilation "owned" by that user. The images may be drawn from a general community pool of images and/or from other images the user is able to access—such as images within other users' compilations. Thus, the user may adopt a compilation assembled by some other user and then modify it, with or without affecting the other user's compilation, depending on the user's access rights. A compilation may include sub-compilations.

The image collaboration system may assist or facilitate a user's selection of images for a compilation, or may select a set of images for the user and allow the user to add/delete images to/from those selected. For example, a user may have the system display the N images estimated to be of most interest to that user. Or, the user may ask for the N most popular images from a given set (e.g., all images relating to a particular event), images that some other particular user (e.g., a family member) found most interesting, etc. The system can also perform automatic layout and/or facilitate a user's layout of a compilation.

A compilation assembled by a user (with or without selections made by the system) may be retained electronically, for viewing on the user's computing or communication device, or may be used to generate a physical compilation (e.g., a photo book, a yearbook, a catalog).

Thus, in an embodiment of the invention, personalized compilations (electronic and/or physical) can be easily assembled. A "general" compilation may be organized by the system or a first user for an entire community, and may have approximately equal interest to all community members. From that general compilation, personalized or tailored compilations may be derived that include images that are more interesting to a specific user or limited group of users (e.g., a family).

For example, a school may assemble a general compilation of some interest to most or all students' families. Tailored compilations may then be developed for individual grades, classes, teams, clubs, students and so on. A personalized compilation may therefore focus on a particular student, her friends, her activities, her classes, etc.

Images may also be shared across communities. In one embodiment, a user who is a member of two communities may set a policy specifying that images added to one community are automatically added to the other if they match some specified criteria, such as subject(s), event, location, etc. For example, two communities corresponding to two different schools or organizations could share images that feature students or members of both. Similarly, an image could be restricted from being shared between communities (or users within a community) based on subject, event or other criteria.

In one embodiment of the invention, an image collaboration system may have relationships with people and other entities outside its communities and community members, to enhance the collaboration or make additional services available, or for other purposes. For example, the system may interface with photographers, artists, photo retouching services, photo organizing services, and so on. These services may be allowed to advertise via the system and users may be able to contract for the services via the system.

The system may provide anonymity to users, so that when an image is provided to an outside service, names subjects of the image (e.g., people in the image) may be replaced with other identifiers or fictitious names. Thus, a user may select or have the system select a set of images for printing as a photo book, and the images may be provided to a suitable service provider without divulging private information.

Figure 2:
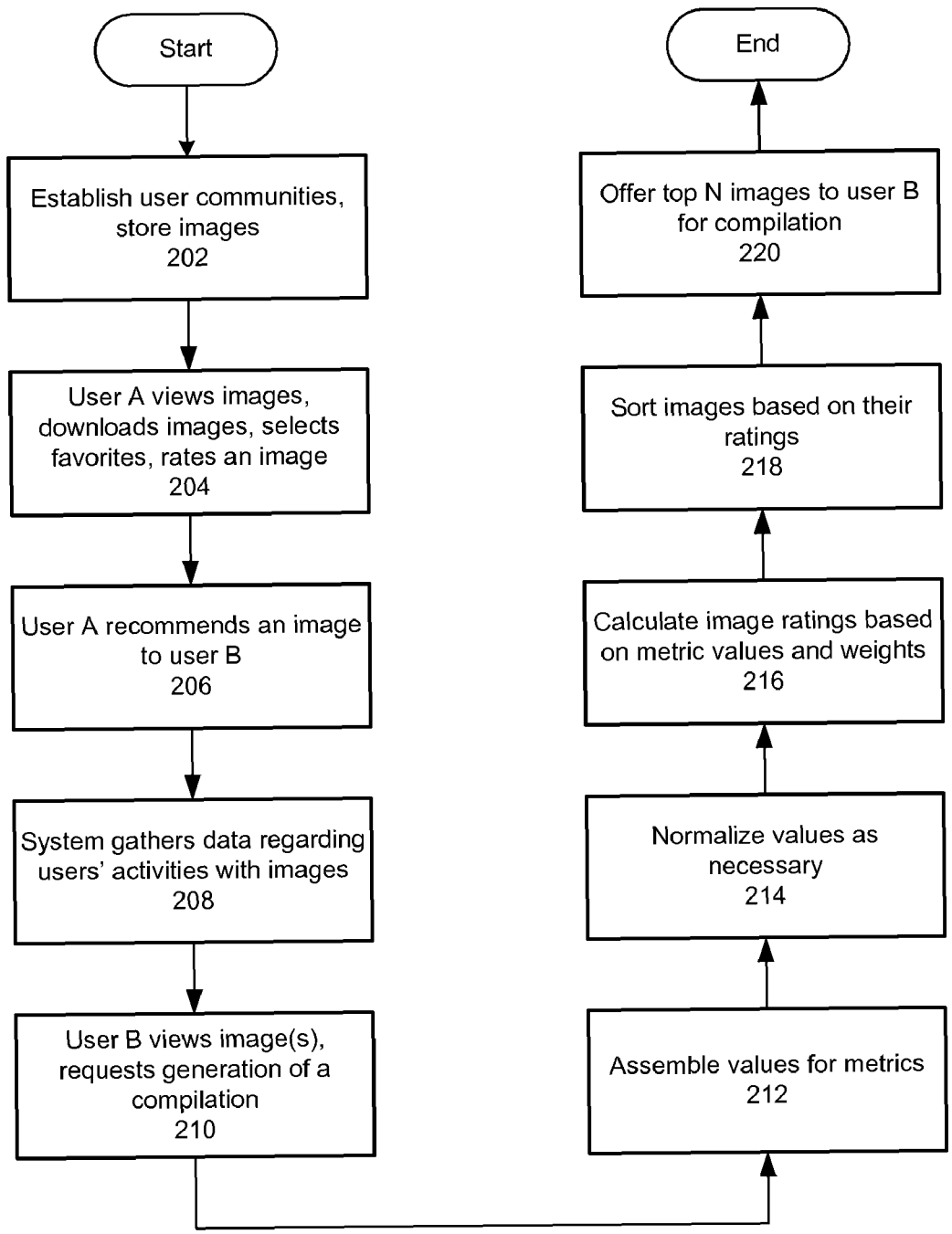
FIG. 2 is a flowchart illustrating one method of collaboratively selecting a set of digital images for a compilation, in accordance with an embodiment of the invention.

FIG. 2 illustrates a method of using an image collaboration system to select a set of images for a compilation, according to one embodiment of the invention. Other methods may be derived from FIG. 2 and the accompanying description without exceeding the scope of the invention.

In operation 202, one or more user communities are established. A community may be associated with an institution or organization, such as a school, a church, a neighborhood association, a team. Or a community may be based on some other interest or activity common to its members, such as a sport, a hobby, and so on. A community may not even have an associated theme, and may simply provide means for sharing and collaborating on images.

Also in operation 202, images are deposited with a community. It may be typical for the number of images to far exceed the number of community members. For example, a community may have tens, hundreds or thousands of members, but may encompass thousands, tens of thousands or hundreds of thousands of images.

A community may be established with any number of member users, and may include sub-communities or groups. Such sub-communities may be defined by any member (or an administrator), and may facilitate restricted sharing of some images. Unless restricted, an image created or submitted within a community may automatically be made available to all members of the community.

In operation 204, a user ("user A") accesses some or all of the community images to select some favorites and make them available for easy retrieval, select some to place into a compilation (e.g., an electronic album of pictures from a school event), download some images, view some images, create or submit an image and/or take other action regarding images. For example, she may rate an image based on how much she enjoys them, whether she thinks the image is good (e.g., clear, in focus, not blurry), whether she thinks it should be removed from the community, etc. She may also create or submit any number of new images (e.g., new photos uploaded from her digital camera).

In operation 206, user A recommends one or more images to another user. The other user may be a family member, a friend or even someone user A barely knows. For example, while reviewing some community images user A may find image P, a particularly good photo of a child of user B, and therefore issue a recommendation of image P to user B.

In operation 208 (and throughout operation of the image collaboration system), the system accumulates data regarding user activity. For example, it tracks image recommendations, accesses (e.g., views, downloads, copies, forwards), inclusions in compilations, explicit (and implicit) ratings or rankings, etc. The system may also note relationships between users, which may be explicit (e.g., user A's profile may indicate that user B is a relative) or implicit (e.g., user A may recommend images to user B relatively frequently).

In operation 210, user B views the image recommended by user A, and/or other images, and decides he wants a compilation of images, which may be electronic or physical. He therefore prompts the system to assemble a compilation of some default number (e.g., twenty, forty) of images, or may specify any number of criteria for the compilation (e.g., number of images, minimum or maximum image size, minimum resolution, event to which the images correspond).

In operation 212, unless any criteria specified by user B conflict, the system automatically selects a number of images that have been estimated to be most interesting to user B. As described above, many different metrics may be considered by the system in rating or ranking the images. In one implementation of this embodiment of the invention, the system applies some or all of the metrics listed in TABLE 1, which provides a description of each metric and a default weight. As described below, values for the various metrics may be modified according to the weights, with the results being manipulated to yield images' rankings.

TABLE 1

| Metric | Weight | Description |
| --- | --- | --- |
| SelfRating | 100 | The "rating" given by the current user for the image:<br>1 if they marked it a favorite<br>0.5 if they never visited it<br>0 if they visited but didn't mark it |
| RecommenderRating | 60 | Average "rating" (as defined above) given by those who recommended the image |
| NumTotalRecommendations* | 60 | Number of times this image has been recommended |
| NumRecommendationsToSelf* | 90 | Number of times this image has been recommended to the current user |
| RecommendationExclusivity | 30 | Reciprocal of the number of persons this image has been recommended to |
| OverallRating | 70 | Average "rating" (as defined above) given by all visitors to the image |
| CoverPhotoFrequency* | 65 | Number of times this image is a cover image in a memory book |
| HighlightPhotoFrequency* | 65 | Number of times this image is a "highlight" (e.g., leading) image in a shared compilation |
| PhotoPrintsCountForInUseOrders* | 40 | Number of prints that have been ordered for this image, wherein the purchase is incomplete |

TABLE 1-continued

| Metric | Weight | Description |
|---|---|---|
| PhotoPrintsCountForCompleteOrders* | 60 | Number of prints that have been ordered for this image, where the purchase has completed |
| OverallPhotoShareCount* | 60 | Number of times this image has been shared |
| PersonalPhotoDownloadsCount* | 80 | Number of times this image has been downloaded by the current user |
| OverallPhotoDownloadsCount* | 70 | Total number of times this image has been downloaded |
| OverallSavedBookPhotoCount* | 60 | Number of times this image appears in a memory book that has been saved (but not yet bought) |
| OverallOrderedBookPhotoCount* | 70 | Number of times this image appears in a memory book that has been bought |
| OverallPhotoCommentsCount* | 65 | Number of comments that have been made on this image |
| OverallPhotoAccessCount* | 50 | Number of times a screen-sized version of this image has been viewed |
| PersonalPhotoAccessCount* | 60 | Number of times a screen-sized version of this image has been viewed by the current user |

In operation 214, values for any number of the metrics (e.g., metrics marked with an "*" in TABLE 1) may be normalized to values between zero and one (inclusive or exclusive). In one implementation an exponential function is used to produce the normal values. For example, a normalized value $M_i$ for the $i^{th}$ metric may be calculated as:

$$M_i = 1 - D \ast e^{(-x)}$$

wherein D may be a constant (e.g., 1) or may be dynamic (in order to enable further variability in the calculation of image ratings), and x is the value of the $i^{th}$ metric prior to normalization.

In operation 216, the interest rating or ranking of an image "R" can then be calculated from its associated (normalized) metric values and weights as follows, wherein $W_i$ is the weight assigned to metric $M_i$:

$$R = \Sigma(M_i \ast W_i) / \Sigma(W_i)$$

Ratings may be calculated for any number of images, such as all images in the community or all images meeting certain criteria (e.g., date/time, event, subject). Depending on the type or nature of the requested compilation, metric weights may be adjusted accordingly. Thus, a metric reflecting how many other users requested a physical photo book including image P may be weighted higher if user B has requested a physical photo book than if he requested an electronic album.

In operation 218, the rated images are sorted based on their ratings.

In operation 220 in this embodiment of the invention, the top N images are offered to user B as suggested images for the requested compilation. User B may add images to the compilation, remove images, alter the selection criteria and request a new compilation, etc.

In the illustrated embodiment of the invention, metric values may be calculated each time they are needed (e.g., when a user requests generation of a suggested set of images). Alternatively, metric values may be continually updated based on user activity. Thus, each time an image P1 is recommended to user B, the NumTotalRecommendations and NumRecommendationsToSelf metrics (see TABLE 1) may be incremented for the tuple {user B, P1}. Metric values may therefore be cached (e.g., on an image application server) and updated as needed.

Methods of rating images described herein may be used to select sets of images for compilations, but may also be used to sort images for presentation to a user for other purposes. For example, a user may connect to the image collaboration system and wish to view images she has not yet seen (e.g., images added to the system since her last visit). The system may rate the unseen images (or retrieve such ratings) to determine an order in which they should be presented to her.

Automatic Layout

In another embodiment of the invention, a collaboratively selected set of images (e.g., a set of images from a system for sharing and collaboratively ranking images) is laid out automatically to form a compilation, with their collaborative rankings affecting the layout process. The layout process may also draw upon metadata associated with the images, such as who uploaded an image, the time/date it was created or uploaded, which album or albums it was stored in, etc. The resulting compilation may be a book (e.g., a yearbook, a memoriam), a poster, an album or take some other form, and may be designed for physical printing and/or viewing electronically.

The automated layout procedure may facilitate such tasks as selecting which images to include in the compilation, sequencing the images within the compilation, choosing which images to include on a particular page, choosing appropriate sizes, resolutions or other characteristics of the images, applying titles or captions, etc.

Figure 3:
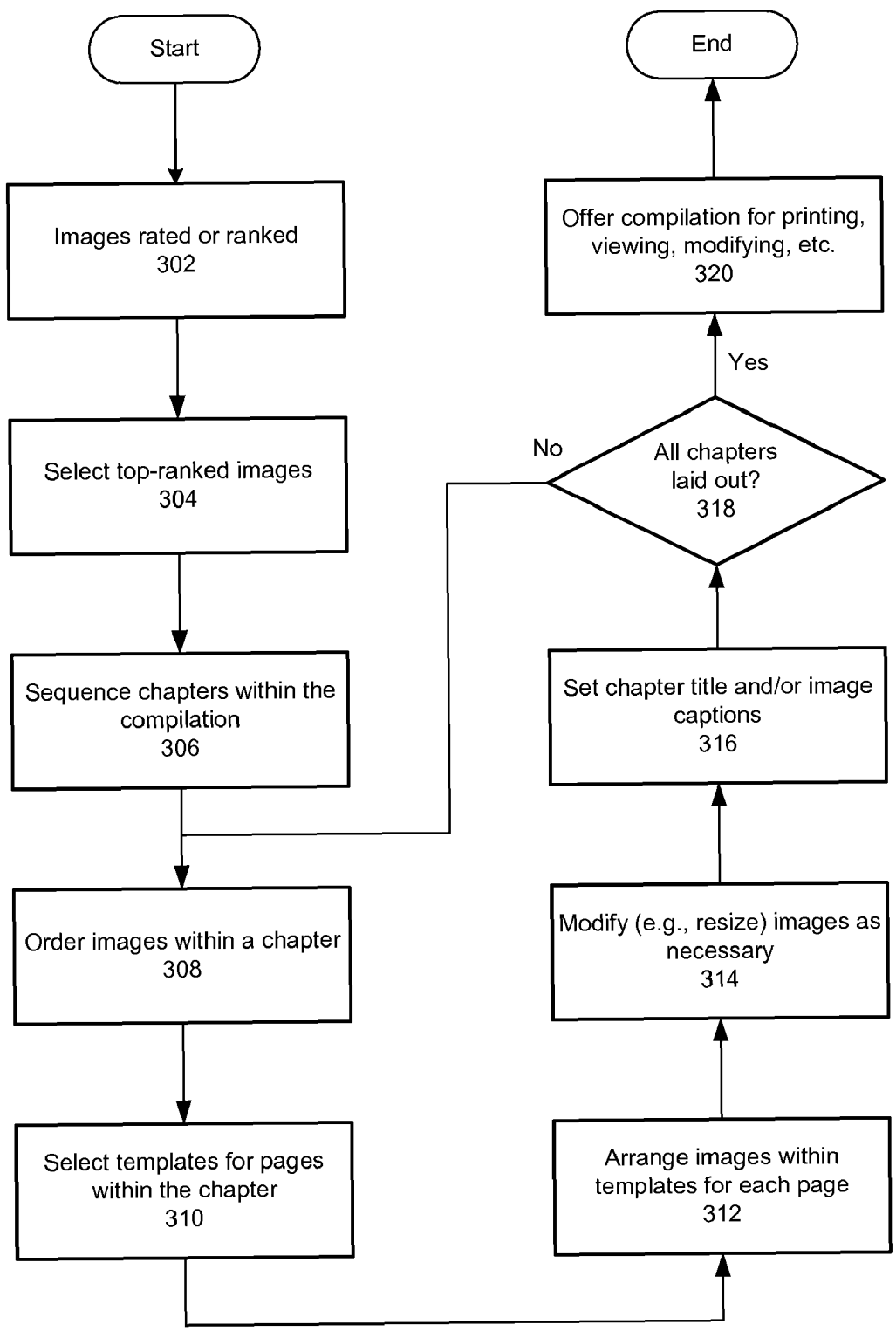
FIG. 3 is a flowchart illustrating one method of automatically laying out a collaboratively selected set of digital images for a compilation, in accordance with an embodiment of the invention.

FIG. 3 illustrates a method of automatically laying out images according to one implementation of this embodiment of the invention. In this embodiment, images have one or more associated rankings or ratings indicating a level of interest in the images. In particular, they may have community rankings that reflect all community users' activity regarding the image, and may also have individual rankings for some or all users that reflect their individual behavior.

An image may have dissimilar community and individual rankings, and any or all of them may be considered in the automated layout process (e.g., depending on whether the resulting compilation is being designed for community or individual use).

In one implementation, an image's community ranking may comprise the average, mean or mode of all individual rankings. In other implementations the community ranking need not be dependent upon the individual rankings.

In operation 302, any number of images are rated or ranked, possibly based on user activity relating to the images, as described in the previous section. Not all of the various ranking factors described above need be employed, however. For example, in one embodiment, the rankings used for automated layout are derived from factors such as time spent viewing an image, resolution of image viewed, whether the image was downloaded, whether the image was purchased, whether the image was recommended to another user, etc.

Factors considered in calculating or adjusting image rankings may weigh negatively or positively. For example, if only a short period of time is spent viewing a particular image by a particular user, the ranking of that image for that user may be decreased (or not increased); a longer viewing period would lead to a positive weight for that factor. As another example, if a number of images having a common subject, theme or other characteristic have relatively high rankings for a user, a new image having the same characteristic may receive a higher initial ranking for that user than it would otherwise.

As yet another example, if a particular image is automatically selected for inclusion in a compilation for a user but that user chooses to remove it, the ranking of that image for that user may be decreased, perhaps significantly.

Regarding recommendations, the ranking of an image recommended to one or more users may be increased for the users to whom the image is recommended, and possibly for the user making the recommendations. However, if an image is recommended to a relatively large number of users, its rankings for users to whom the image is not recommended may decrease.

In one alternative embodiment of the invention individual images may be explicitly ranked or rated by a user when he or she desires a compilation.

In operation 304 some number of relatively highly ranked images is selected for inclusion in the compilation. The number selected may be specified by the user requesting the compilation, or some default number may be initially chosen by the system. For example, based on the type of compilation requested—a personal yearbook, a yearbook reflecting the entire community, a poster relating to a specific event—an appropriate number of initial images may be selected. The number of images selected may vary widely, perhaps from a dozen or two (e.g., for a poster) to a few dozen (e.g., for a personalized compilation) to several dozen or even hundreds (e.g., for a community-wide compilation).

The rankings examined to select the images may also depend on the type or purpose of the compilation. If the compilation is intended to relate to one individual or a small group of individuals (e.g., a baby's first year, a couple's travel around the world), only those individuals' personal rankings of the images may be considered (i.e., not the community-wide rankings), and/or rankings of related individuals (e.g., friends, relatives).

If, however, a more general compilation is desired, such as a yearbook for a school class or an entire school, then only community-wide rankings may be considered. Community rankings may be considered "absolute" rankings because they reflect interest in images throughout the community. In short, any rankings (e.g., community, individual) based on any desired factors may be used to order a set of images and facilitate selection of those having the highest rank.

In yet another embodiment, some mix between individualized and community-wide rankings may be employed. For example, a compilation may be desired to cover one or more events or subjects of general interest to the community (e.g., a school year) but which is customizable to suit different members of the community. The community rankings could be used to select and/or layout the portion of the compilation intended to be common to all individuals, and then individual rankings could be used for the customized portions.

In operation 306, a first level of image sequencing is performed by identifying multiple chapters for the compilation. If the number of images or size of the compilation is relatively small, this operation may not be needed.

In one implementation, chapters within the compilation are based on the community albums in which they are stored. Thus, all images from one album may be placed in the same chapter. Title of the chapters may be derived from album titles (e.g., "Easter", "3$^{rd}$ Birthday", "Wedding"). Similar photos or similar albums (e.g., multiple albums from different users all titled "Halloween") may be merged into one chapter or may be kept separate.

Illustratively, after the chapters are selected they may be sequenced based on the timestamp of their creation. This may help the compilation better reflect the chronology of events depicted in the images. Alternatively, chapters may be sequenced based on other information, such as the dates of images being placed in the chapters, the creators of the images or albums, etc.

In operation 308, a second level of image sequencing is begun to order images within a chapter. This may also be performed based on time for images that have associated time metadata (e.g., date/time of creation or upload).

In one implementation, images within a chapter may be examined to identify time-based clusters of images. For example, when multiple images are identified that have similar timestamps (e.g., time of creation), it may be assumed that they are related (e.g., depict the same subject) and should therefore appear relatively close to each other within the chapter. A cluster of related images having the same or similar subject may also be identified via image captions, a title or caption on an album containing the images, or in some other manner.

Analysis of images' associated time data may also be used to identify and/or correct time skew between users. For example, if multiple users are taking pictures of the same event but the time settings are different on their cameras, they may end up with similar patterns of image creation (e.g., when a particular child appears onstage in a school play, when the creator's favorite team is making a play), but the actual time data will differ because of the skew. If similar patterns can be identified in this manner the skew can be corrected for and further facilitate grouping of related images. Other image metadata may identify the user who created or uploaded an image, the type of camera used to create the image, image resolution, etc. and may also be used to identify images that may be related.

For images that have no associated time information (or that have only unreliable time information), sequencing may be performed randomly or some processing may be performed to determine which other image or images they are most similar to, and may then be sequenced near those images. For example, the images may be analyzed for color variance, to identify how many faces are featured, to determine image quality (e.g., how blurry), etc. Any of these factors may then be used to sequence them.

In one embodiment of the invention, when images from multiple albums are being included in a single chapter, the images may be interleaved rather than presenting all images from one album and then all images from another album.

When multiple related images are identified (e.g., pictures taken close in time by a single user), to avoid using duplicate (or nearly duplicate) images, only the highest ranked of those images may be used in the compilation. In addition, the rankings of the related images may be altered to accentuate their differences. Thus, with normalized rankings, if one of the related images has a ranking of 0.7 and the others are 0.6, then the one image's ranking may be increased (e.g., to 0.8) and the others' decreased (e.g., to 0.5). This may help keep them out of the same compilation because the lowered rankings may drop them below other images having better rankings.

Besides proximity in time, other methods of identifying similar/duplicate images include processing the images to produce and compare histograms or numbers of faces, perform some pattern matching. Also, the positioning of common components (e.g., faces, a pattern) within multiple images may be compared to determine if they are likely to be substantially identical.

In operation 310, a sequence of page templates is chosen for the chapter. Each template specifies a number of images to appear on the page, and may also specify other criteria such as the sizes of the images to be placed.

For example, in different templates having the same number of images, the images may have differing prominences. Thus, one template may be designed to have one image with overall prominence (e.g., bigger, better resolution) and other images with other prominences. Another template may be designed to present all images with equal prominence. Any number of levels of prominence may be featured in one template.

In one embodiment, the templates are chosen based on the grouping or clustering of images detected in operation 308. Thus, if a distinct cluster of 5 images is identified within the chapter's images, then a layout configured for 5 images may be selected to present all of them on the same page. Another cluster may have only 2 images and so a template including at least 2 images may be selected to keep them on the same page. If distinct clusters cannot be identified, then images may be grouped for a single page so as to enable the use of a desired variety or sequence of page templates.

In one alternative embodiment, after the images to be included in a chapter are identified, a distribution of templates for those images is then selected so as to present a pleasing variety of page templates throughout the chapter. Only after the templates are selected are the images ordered or sequenced to fill the templates. In yet another alternative embodiment, the ordering of images and selection of templates may be an iterative process attempting not only to keep related images together on one page, but to also maximize the visual appeal of the chapter by incorporating a variety of templates.

In operation 312, after the images to be included on a page and a template for the page have been selected, the images are arranged within the template. As described above, a page template may specify how many images to include on the page, but the actual layout of the images within the template may be flexible.

In particular, after the N images for a particular page's template are known, the design of that template may be affected by the images. For example, if one of the N images has a ranking significantly higher than the others, then it may receive the greatest prominence (e.g., size, resolution), which may cause it to be resized. The other images may then be sized accordingly to reflect their rankings. As another example, if all the images have similar rankings, then all may receive the same prominence (e.g., same size).

Conversely, when the page template was being selected in operation 310, it may have been chosen based on the spread of rankings within the images.

When the template design/layout is configured in operation 312, the design of other pages in the chapter or compilation may also be considered. In particular, instead of using the same design for each template that includes one image with prime prominence, two images with secondary prominence and some number of images with tertiary prominence, different instances of the same template may position the images differently. Then, the most prominent image won't always be in the same area and the resulting variety will be more aesthetically pleasing.

In operation 314, images within the page are resized or adjusted as desired (e.g., to adjust their prominence according to their rankings). As already described, images may be resized to increase or decrease their prominence within a page (or chapter). However, some images may be limited in how they can be modified. For example, a relatively low quality image that becomes blurry when expanded (e.g., as detected by Fast Fourier Transform processing) may be limited in how much (or whether) it will be resized. An image may even be decreased in prominence, even if it has a relatively high ranking, if it is of low quality.

In operation 316, image captions and/or a chapter title may be applied. If the images have associated captions in their home albums, those captions may be applied within the compilation also. Further a title for the chapter may be selected based on titles or captions of the album(s) to which the chapter corresponds, common wording among the album titles or within the chapter's images, or in some other manner.

The system may maintain a list of holidays, events and/or other significant events, and images or albums created on those dates may be assumed to be related. For example, images created on October 31 may be presumed to relate to Halloween. Within a community related to a school, if the schools calendar is integrated into the system images created on appropriate days may be deemed related to "First Day of Classes", "Homecoming", "Graduation", etc.

In operation 318, it is determined whether all chapters have been laid out. If not, the method returns to operation 308 to sequence another chapter; otherwise the method continues with operation 320.

In operation 320, the completed compilation is offered to the requesting user for viewing, printing (e.g., and purchasing), modifying or other purpose. Illustratively, the user may be able to modify the compilation to remove undesired images, include a desired image that was omitted, add or change an image caption, chapter title or compilation title, recommend the compilation to another user, etc.

As one skilled in the art will appreciate, the method depicted in FIG. 3 may be readily amended depending on the compilation to be laid out. For example, if the compilation is to be a poster (e.g., instead of a yearbook), then no chapters need to be arranged and sequencing of the images is reduced to laying out all images on a single page. Further, in a poster, sequencing of the images may involve separating rather than grouping related images to make the poster more balanced.

In one embodiment of the invention, to automatically select images for inclusion in a compilation the system may not simply take the $N(N>0)$ images having the highest overall rankings. Instead, perhaps to achieve a greater variety of sampling from different albums or sources, the system may first identify the top $M$ ($M>0$) albums (e.g., the M albums having the highest average image rankings) and then take some number X(X>0) from each of those albums so that X*M=N. Or, the highest ranked images in any number of albums may be examined and then the overall top N images from those images may be adopted. Various other methods of selecting some number of ranked images for inclusion in a compilation may be employed without exceeding the scope of the present invention.

The program environment in which a present embodiment of the invention is executed illustratively incorporates a general-purpose computer or a special purpose device such as a hand-held computer. Details of such devices (e.g., processor, memory, data storage, display) may be omitted for the sake of clarity.

It should also be understood that the techniques of the present invention may be implemented using a variety of technologies. For example, the methods described herein may be implemented in software executing on a computer system, or implemented in hardware utilizing either a combination of microprocessors or other specially designed application specific integrated circuits, programmable logic devices, or various combinations thereof. In particular, the methods described herein may be implemented by a series of computer-executable instructions residing on a suitable computer-readable medium. Suitable computer-readable media may include volatile (e.g., RAM) and/or non-volatile (e.g., ROM, disk, DVD) memory, carrier waves and transmission media (e.g., copper wire, coaxial cable, fiber optic media). Exemplary carrier waves may take the form of electrical, electromagnetic or optical signals conveying digital data streams along a local network, a publicly accessible network such as the Internet or some other communication link.

The foregoing embodiments of the invention have been presented for purposes of illustration and description only. They are not intended to be exhaustive or to limit the invention to the forms disclosed. Accordingly, the scope of the invention is defined by the appended claims, not the preceding disclosure.

What is claimed is:

1. A method of automated layout of images within a compilation, the method comprising:
   rating the images by eliciting users' recommendations to other users;
   for each image, associating values for multiple metrics, including:
      whether a user selected the image as a favorite;
      how often the image was recommended among users;
      how often the image was downloaded;
      an average rating of the image by all users who rated the image;
      how long the image was viewed by the users;
      whether an enlarged version of the image was accessed; and
      clarity of the image; and
   for each image, combining the values for the metrics to yield a ranking of the image;
   selecting a set of top-rated images for the compilation from a pool of images shared within a community of users;
   dividing the selected images into multiple chapters;
   within each chapter of images:
      sequencing images in the chapter into pages;
      selecting page templates for each page; and
      arranging the images on each page with each image's prominence reflecting the image's rating; and
      storing the compilation.

2. The method of claim 1, further comprising:
   setting a chapter title based on a source of images within the chapter.

3. The method of claim 1, further comprising:
   setting a chapter title based on a default event associated with a date of creation of an image within the chapter.

4. The method of claim 1, further comprising:
   offering the compilation to a first user for printing in physical form.

5. The method of claim 1, further comprising:
   offering the compilation to a first user for viewing in electronic form.

6. The method of claim 1, wherein the multiple chapters correspond to sources of the images.

7. The method of claim 6, wherein said sources are albums maintained by the users.

8. The method of claim 1, wherein said sequencing comprises:
   identifying a cluster of images created close in time to each other.

9. The method of claim 1, wherein said sequencing comprises:
   identifying a cluster of images having a similar subject.

10. The method of claim 1, wherein said selecting page templates comprises:
    identifying a number of images to place on a page; and
    selecting a page template for the page based on the number of images;
    wherein a variety of different page templates are used within the chapter.

11. The method of claim 1, wherein said selecting page templates comprises:
    identifying a distribution of ratings of images to place on a page; and
    selecting a page template for the page based on the distribution of ratings; wherein a variety of different page templates are used within the chapter.

12. The method of claim 1, wherein said selecting page templates comprises:
    identifying when an image to be placed on a page was created; and
    selecting a page template for the page based on when the image was created;
    wherein a variety of different page templates are used within the chapter.

13. The method of claim 1, wherein said selecting page templates comprises:
    identifying one or more subjects of an image to be placed on a page; and
    selecting a page template for the page based on the one or more subjects;
    wherein a variety of different page templates are used within the chapter.

14. The method of claim 1, wherein said arranging comprises:
    resizing one or more images on the page in accordance with their ratings.

15. The method of claim 1, wherein the compilation is a yearbook.

16. A method of automated layout of images within a compilation, the method comprising: rating the images on the basis of activity regarding the images, including:
    a duration of time a user views an image;
    a frequency with which a user views an image;
    addition of a caption to an image;
    requesting an enlarged view of a viewed image;

recommendation of an image to a single user by multiple other users; and any relationships between the users who access an image and users to whom they recommend the image;

selecting a set of top-rated images for the compilation from a pool of images shared within a community of users;

dividing the selected images into multiple chapters;

within each chapter of images:

sequencing images in the chapter into pages;

selecting page templates for each page; and arranging the images on each page with each image's prominence reflecting the image's rating; and storing the compilation.

17. The method of claim 16, further comprising determining possible subjects of one or more images by noting:

which users access said image; and which users, if any, said image is recommended to by the users who access said image.

18. The method of claim 1, wherein said selecting page templates comprises:

identifying a subset of the images that is highly ranked among a subset of the community of users, wherein all members of the subset of the community have some relationship with each other; and selecting a page template configured to enable the subset of images to be placed on a single page.

19. The method of claim 16, further comprising offering the compilation to a first user for printing in physical form.

20. The method of claim 16, further comprising offering the complication to a first user for viewing in electronic form.

21. The method of claim 16, wherein said selecting page templates comprises:

identifying when an image to be placed on a page was created; and selecting a page template for the page based on when the image was created;

wherein a variety of different page templates are used within the chapter.

22. The method of claim 16, wherein said selecting page templates comprises:

identifying a subset of the images that is highly ranked among a subset of the community of users, wherein all members of the subset of the community have some relationship with each other; and selecting a page template configured to enable the subset of images to be placed on a single page.

23. The method of claim 16, wherein said arranging comprises:

resizing one or more images on the page in accordance with their ratings.

* * * * *